United States Patent Office 3,425,997
Patented Feb. 4, 1969

3,425,997
PHENOXIDES AS TRANSESTERIFICATION CATALYSTS
Otto K. Carlson, Marcus Hook, and John A. Price, Swarthmore, Pa., assignors to FMC Corporation, Philadelphia, Pa., a corporation of Delaware
No Drawing. Filed Oct. 7, 1966, Ser. No. 584,970
U.S. Cl. 260—75    5 Claims
Int. Cl. C08g *17/08*

ABSTRACT OF THE DISCLOSURE

Process for preparing polyethylene terephthalate comprising carrying out a transesterification reaction between dimethyl terephthalate and ethylene glycol in the presence of a phenoxide having the formula $M(OC_6H_5)_2$, wherein M represents a metal from Groups II–A, II–B, or IV–A of the Periodic Table, to form a prepolymer and then polycondensing said prepolymer in the presence of a polycondensation catalyst.

---

This invention relates to a method of preparing filament forming linear polyester. More particularly, it relates to an improved method for preparing filament-forming polyethylene terephalate resin through the use of a transesterification catalyst.

The manufacture of a filament-forming polyester resin from a dialkyl terephthalate and glycol is well-known in the art. Generally, in the preparation of such polyesters, a dialkyl terephthalate and glycol are first combined and subjected to an ester-interchange reaction or transesterification in the presence of a transesterification catalyst at elevated tempertaure and atmospheric pressure. The resulting product or prepolymer is then polycondensed at higher temperatures and under reduced pressure in the presence of a polycondensation catalyst to form the desired filament-forming polyester resin.

A polyethylene terephthalate resin suitable for melt spinning into filaments should have a carboxyl content value of about below 50 equivalents per million grams (eq./$10^6$ gr. or meq./kg.), an intrinsic viscosity of not less than about 0.60, and a birefringent melting point of at least about 258°–260° C. Polyster resins having a relatively high carboxyl content and/or low molecular weight are generally not suitable for filament production due to the poor degree of tenacity, thermal stability and hydrolytic stability of the filaments produced therefrom. From a commercial standpoint, it is essential that the polyester resin be produced in the shortest possible time and the desired degree of polymerization be obtained. One of the ways of evaluating the effectiveness of a transestification catalyst is by measuring the "half-time" of the transesterification catalyst. The "half-time" is defined as the time necessary for the first one-half of the theoretical amount of methyl alcohol that will be produced during the transesterification reaction to distill from the reaction mixture. It is desirable that the "half-time" be as short as possible, but in any instance, be less than about 60 minutes.

It is an object of this invention to prepare polyethylene terephthalate resin suitable for melt extrusion into nondegraded, processable filaments through a transesterification and polycondensation process.

Another object of the present invention is to provide an improved method for accelerating the ester-interchange between ethylene glycol and dimethyl terephthalate.

These and other objects are accomplished in accordance with the present invention which involves a method of preparing filament-forming polyethylene terephthalate wherein dimethyl terephthalate and ethylene glycol are transesterified and the resulting transesterified product is polycondensed in the presence of a condensation catalyst, the improvement comprising carrying out said transesterification reaction in the presence of a catalytic amount of a phenoxide.

The phenoxides that are used as catalysts in the transesterification step of the present method may be varied to meet any requirements of reaction conditions and desired product. The term "phenoxide" as used herein includes all suitable metal salts of phenol or mono- or dialkylphenols. While the present invention is not to be limited to any particularly suitable phenoxide, it has been found that the preferred phenoxides are those represented by the formula $M(OC_6H_5)_2$, in which M represents a metal from Groups II–A, II–B, and IV–A of the Periodic Table (See Merck Index, Sixth Edition, inside front cover). For example, among the transesterification catalysts which can be used in accordance with the present method are calcium phenoxide, zinc phenoxide, and lead phenoxide.

Generally, concentrations of the present transesterification catalysts in the range of from about 0.01% to about 0.20%, based on the weight of dimethyl terephathalate in the subject dimethyl terephthalate-ethylene glycol reaction mixture, is used. Higher or lower concentrations of the present catalyst can also be used. However, when concentrations less than the above are used, their catalytic effect is generally reduced whereas if greater concentrations than this are used, no further improvement in the present method or desired product is obtained. Usually, it has been found that from about 0.02% to about 0.1% of the present phenoxides, based on the weight of dimethyl terephthalate in the reaction mixture, is preferred to produce the linear polyester resins of the present method.

In general, the preparation of filament-forming polyesters of the present invention via the ester-interchange reaction is carried out with a molar ratio of ethylene glycol to dimethyl terephthalate of from about 1:1 to about 15:1, but preferably from about 1.51:- to about 2.6:1. The ester-interchange reaction is generally carried out at atmospheric pressure in an inert atmosphere, such as nitrogen, initially at a temperature range of from about 125° C. to about 250° C. but preferably between about 150° C. and 200° C. in the presence of an ester-interchange catalyst. During this first stage, methyl alcohol is evolved and is continually removed by distillation. After a reaction period of about one hour, the temperature of the reaction mixture is raised to about from 200° C. to about 300° C. for approximately 3 to 5 hours in order to complete the reaction and distill off excess glycol which has been produced and induce polycondensation. The main and desired product of the ester-interchange reaction is the prepolymer which is comprised principally of bis(2-hydroxyethyl)terephthalate. The second stage or polycondensation step of the present method is generally achieved under reduced pressure within the range of from about 225° C. to about 325° C. for about 3–5 hours. It is preferable to carry out both the first and second stage of the present method under agitation.

The polycondensation step of the present method is generally accomplished through the addition of a suitable catalyst, for example, antimony trioxide, antimony pentoxide, antimony trisulfide, antimony trifluoride, antimony triphenyl, zinc acetylacetonate, and the like. The polycondensation catalyst may be added to the present reaction mixture before initiating the ester-interchange reaction between the ethylene glycol and dimethyl terephthalate or after the product thereof is formed. The polycondensation catalysts are generally employed in amounts ranging from about 0.005 to about 0.5%, based on the total weight of reactants.

The following examples of several preferred embodiments of the present invention will further serve to illustrate the present invention. All parts are by weight, unless otherwise indicated.

EXAMPLES

A mixture comprising 600 grams of dimethyl terephthalate, 396 mls. of ethylene glycol and 0.24 grams of a phenoxide, as listed in the following table, was charged into a reaction vessel equipped with a nitrogen inlet, a distillation arm, heating means, and stirring means. The reaction mixture was agitated and heated at atmospheric pressure to about 197° C. over a period of about 30 minutes under a nitrogen blanket whereby by-product methyl alcohol was distilled off. The reaction mixture was held at about 197° C. for about 2 hours. Then, the temperature of the reaction mixture was allowed to rise in order to distill off any remaining byproduct comprising methyl alcohol and ethylene glycol, and form the desired polyester prepolymer product. After about 30 minutes, the temperature had risen to about 230° C. at which time the formed prepolymer was cooled under a nitrogen blanket.

50 grams of the above prepolymer was combined with 0.02 grams of antimony trioxide in a reaction vessel equipped with a nitrogen inlet, a vacuum source, a distillation arm, stirring means, and heating means. The pressure within the reaction vessel was reduced to from about 0.1 to about 0.05 mm. of mercury at 285° C. under a nitrogen blanket and the reaction mixture was agitated under these conditions for about three hours to bring about the polycondensation of the prepolymer and formation of the polyester resin.

The following table sets forth the results of various reactions carried out as described above.

The results in the above examples indicate that the presence of a suitable phenoxide during the transesterification step in the production of polyester resin, in general, facilitates the preparation of and improves the prepolymer formed and in turn the polyester resin product. Through the use of such a transesterification catalyst, the transesterification reaction is accelerated and the resulting prepolymer is, in general, characterized as being a highly transesterified product as indicated by the low carboxyl content of the prepolymers. Further, the prepolymers of the present method can be condensed to yield polyester resins which have high molecular weights, as indicated by their intrinsic viscosity, and desirably high melting points.

It will be apparent that many various different embodiments of this invention may be made practicing this invention without departing from the spirit and scope thereof, and therefore, it is not intended to be limited except as indicated in the appended claims.

We claim:

1. In a process for the preparation of a filament-forming polyethylene terephthalate resin wherein dimethyl terephthalate and ethylene glycol are transesterified and the resulting transesterified product is polycondensed in the presence of a condensation catalyst, the improvement comprising carrying out the said transesterification in the presence of a catalytic amount of a phenoxide as a transesterification catalyst having the formula $M(OC_6H_5)_2$, in which M represents a metal from Groups II–A, II–B, or IV–A of the Periodic Table (Merck Index, Sixth Edition).

2. The process of claim 1 wherein the phenoxide is present in an amount of from about 0.01% to about 0.20%, based on the weight of dimethyl terephthalate in the reaction mixture.

3. The process of claim 1 wherein the phenoxide is calcium phenoxide.

4. The process of claim 1 wherein the phenoxide is lead phenoxide.

5. The process of claim 1 wherein the phenoxide is zinc phenoxide.

TABLE

| Example No. | Transesterification additive | Half-time (minutes) | Prepolymer carboxyl content, meq./kg. | Polyester intrinsic viscosity | Polyester carboxyl content, meq./kg. | Melting pt. °C. |
|---|---|---|---|---|---|---|
| 1 | Calcium phenoxide ($Ca(OC_6H_5)_2$) | 43 | 1.6 | 0.934 | 10.8 | 265 |
| 2 | Lead phenoxide ($Pb(OC_6H_5)_2$) | 20 | 2.5 | 0.895 | 11.0 | 261 |
| 3 | Zinc phenoxide ($Zn(OC_6H_5)_2$) | 20 | 6.2 | 0.933 | 40.9 | 265 |

References Cited

UNITED STATES PATENTS 3,047,515 7/1962 Piirma _____ 260—75
3,329,651 7/1967 Dobinson _____ 260—75

WILLIAM H. SHORT, *Primary Examiner.*

L. P. QUAST, *Assistant Examiner.*

U.S. Cl. X.R.

260—475

UNITED STATES PATENT OFFICE
CERTIFICATE OF CORRECTION

Patent No. 3,425,997                                February 4, 1969

Otto K. Carlson et al.

It is certified that error appears in the above identified patent and that said Letters Patent are hereby corrected as shown below:

Column 2, line 41, "1.51:" should read -- 1.5:1 --. Column , line 22, "byproduct" should read -- by-product --.

Signed and sealed this 24th day of March 1970.

(SEAL)
Attest:

Edward M. Fletcher, Jr.
Attesting Officer

WILLIAM E. SCHUYLER, JR.
Commissioner of Patents